| United States Patent | [11] 3,630,323 |

| [72] | Inventor | Daniel J. Hickle |
| | | Williamston, Mich. |
| [21] | Appl. No. | 772,250 |
| [22] | Filed | Oct. 31, 1968 |
| [45] | Patented | Dec. 28, 1971 |
| [73] | Assignee | Motor Wheel Corporation |
| | | Lansing, Mich. |

[54] BRAKEDRUM AND HUB ASSEMBLY
2 Claims, 2 Drawing Figs.

[52] U.S. Cl..................................................... 188/218 R,
29/458, 188/18 R, 301/6 E
[51] Int. Cl....................................................... F16d 65/10
[50] Field of Search........................................... 188/18, 18
A, 218, 218 A, 264 I; 29/458; 301/6 E

[56]            References Cited
UNITED STATES PATENTS

| 265,262 | 10/1882 | Howe............................ | 188/218 |
| 2,251,539 | 8/1941 | Ash................................ | 188/18 A |
| 3,024,047 | 3/1962 | Schmohl....................... | 29/458 UX |
| 3,343,252 | 9/1967 | Reesor.......................... | 29/458 |
| 2,770,325 | 11/1956 | Dombeck...................... | 118/18 |

*Primary Examiner*—George E. A. Halvosa
*Attorney*—Barnes, Kisselle, Raisch & Choate ABSTRACT: An assembly of an automotive vehicle wheel hub and brakedrum and method of assembly wherein the mutually engaging mounting surfaces of the hub and drum, located in the annular zone where the drum is attached to the hub by the usual hub wheel mounting bolts, having interposed between them when properly aligned a plastic material which fills the voids between the surfaces and hardens to rigid material. This filler material eliminates distortion of the drum when the hub and drum assembly are mounted to a wheel and subjected to the clamping stress of the mounting bolts, thereby eliminating roughness, chattering and/or noise when the wheel brakes are applied.

PATENTED DEC 28 1971
3,630,323
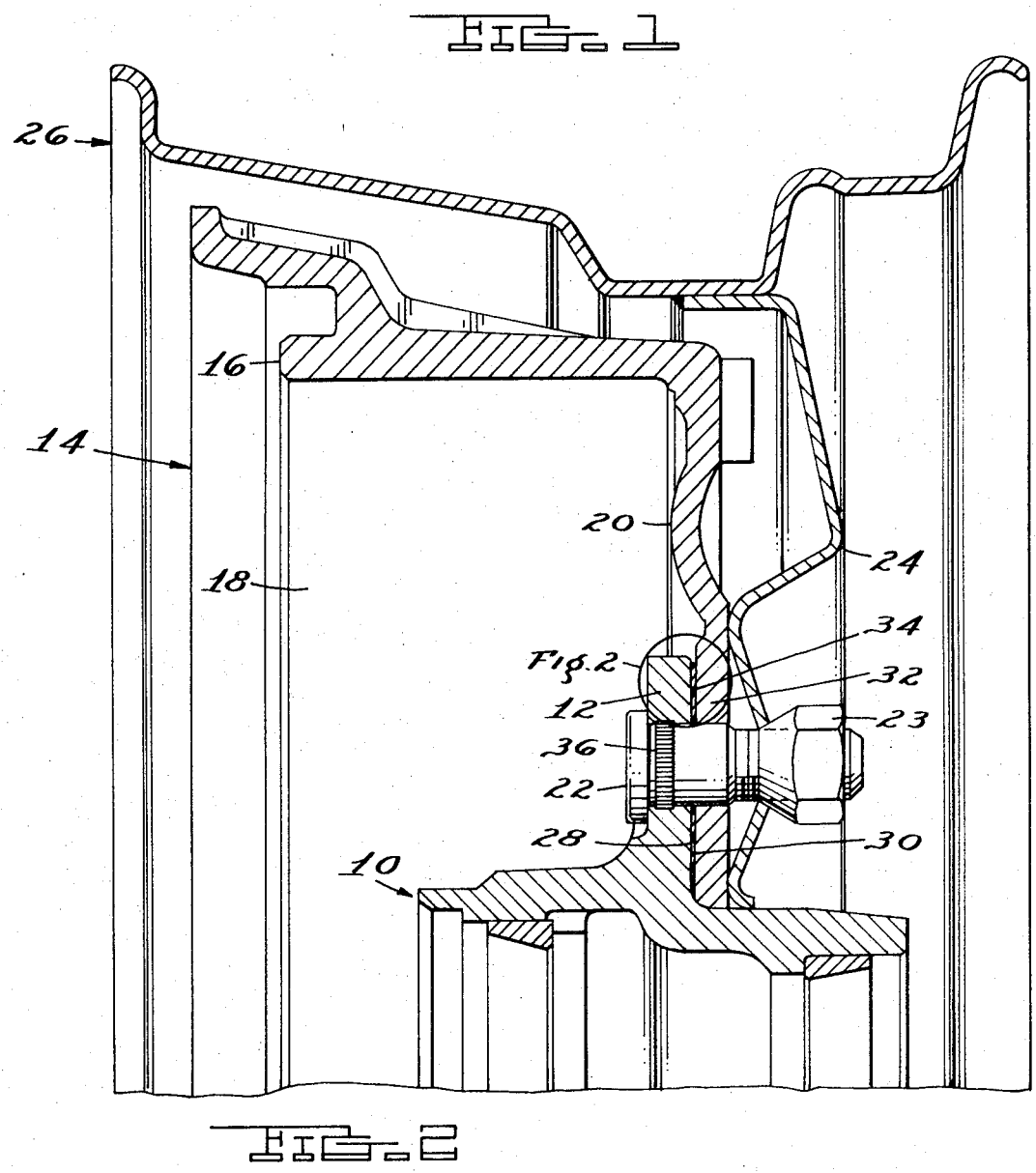
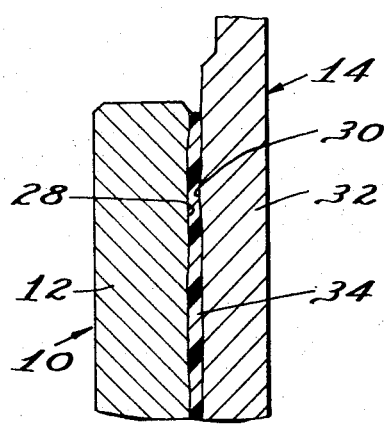
INVENTOR.
DANIEL J. HICKLE
BY
Barnes, Kisselle, Raisch
& Choate
ATTORNEYS

BRAKEDRUM AND HUB ASSEMBLY

This invention relates generally to brakes, in particular to a brakedrum and hub assembly and method of making the same.

An object of the present invention is to provide an improved brakedrum and hub assembly and method of making the same which reduces or eliminates distortion in the brakedrum, obviates the need for close tolerance finish machining and matching of the mating surfaces of the hub and drum, facilitates assembly and reduces the cost of manufacture of the hub and drum assembly.

Other objects as well as features and advantages of the present invention will become apparent from the following detailed description taken in conjunction with the accompanying drawing wherein:

FIG. 1 is a fragmentary vertical center sectional view through the axis of an improved hub and drum assembly of the present invention shown mounted to a conventional automotive passenger vehicle wheel of the drop center rim, all-steel-type construction.

FIG. 2 is a fragmentary showing of the portion of the hub flange and drum back circled in FIG. 1, greatly enlarged over the showing thereof in FIG. 1 and illustrating on an exaggerated scale the plastic filler material interposed between the mating surfaces of the hub and drum in accordance with the present invention.

Referring in more detail to the accompanying drawing, a conventional wheel hub 10 having the usual radially outwardly extending mounting flange 12 is shown in FIG. 1 with a conventional brakedrum 14 mounted on the hub. Drum 14 herein shown by way of example is a "full cast" brakedrum, i.e., a one-piece iron casting, and includes the usual cylindrical drum ring portion 16 having a cylindrical inner brake track surface 18, and a radially extending back portion 20 integrally joined to ring 16. Drum 14 is attached to hub 10 by a circular row of five of the usual wheel bolts 22, as described in more detail hereinafter, which also serve to mount a steel disc 24 of a conventional automotive drop center rim wheel 26 to the subassembly of hub 10 and drum 14.

In the prior conventional drum and hub assembly, the annular radially extending surface 28 in the bolt circle area of flange 12 and the mating surface 30 in the bolt circle area of mounting flange 32 of drum 14 are usually machined to provide parallelism and concentricity of the assembled parts. Nevertheless surfaces 28 and 30 remain relatively rough and uneven, as shown on an exaggerated scale in FIG. 2. For example, the normal tolerance from flatness for these surfaces may be 0.005 inch in the direction of concavity of these surfaces. In accordance with the present invention, it has been discovered that even when the hub and drum are so machined a distortion is produced in brake track 18 when mounting surfaces 28 and 30 are in metal-to-metal contact and subjected to the clamping stress developed when squeezed together by tightening down wheel nuts 23 on bolts 22 when wheel 26 is mounted on the drum, either during manufacture or service. The small but significant mismatch in these surfaces under these conditions results in a distortion of back 20 which is transmitted by deflection of ring 16 to the braking surface 18 of the drum. This condition in turn has been found to be the cause of roughness in the operation of the vehicle brakes, sometimes to the point of chatter, as well as causing reduced braking efficiency when the vehicle brakes are applied.

In accordance with the principal feature of the present invention, a superfluous amount of a plastic material, preferably an epoxy adhesive such as that produced commercially by Goodyear Tire and Rubber Company and identified by their part No. 85–9, Parts A and B, or by B. F. Goodrich Company and identified by their part No. A1177B, Parts A and B, which comprise a two part system made up of a resin and a hardener or catalyst, is applied to mating surfaces 28 and 30 of hub flange 12 and drum flange 32 prior to initial assembly of these parts. Then, as described in more detail hereinafter, these two parts are squeezed together to their assembled position shown in FIG. 1 before the epoxy adhesive 34 has cured beyond a readily yieldable consistency. The excess adhesive 34 flows into and fills the voids, valleys and machining grooves in the juxtaposed mounting surfaces 28 and 30 of the two parts as they are forced together under assembly fixture pressure. Then, after the adhesive or filler 34 has completely hardened or cured, it provides sufficient joint strength (resistance to compression) to prevent distortion of drum 14 when flange 12, drum 14 and disc 24 are more tightly squeezed together by the clamping stress imposed upon tightening down nuts 23 to the recommended wheel mounting torque value. The addition of the epoxy filler material 34 between the mating surfaces of the hub and drum in the above manner has been found to provide a 40 percent improvement a reduction in the amount of out-of-round distortion present in braking surface 18 as compared to an assembly of conventional construction lacking such filler material.

In accordance with the preferred method of the invention, hub 10 and drum 14 are manufactured in the conventional manner and their mounting surfaces 28 and 30 are merely roughed machined in the normal manner as described above. A suitable plastic filler material 34 as described above is selected, preferably one curable at room temperature when the catalyst and resin are intermixed, but of a relatively gooey or sticky consistency suitable for a trowel or scraper knife application, and one which has a relatively short curing time and which when completely cured provides a high strength compression stress resistant body of material. With the hub 10 and drum 14 separated, material 34 is applied immediately after intermixture of the resin and catalyst in a relatively even layer over surface 28, and likewise applied over surface 30. Material 34 may be trowelled on by hand or applied by suitable coating machinery. Normally, wheel bolts 22 are preassembled in hub 10 prior to the coating step and are held permanently in position by a press fit of a knurled circumferential rib 36 on shank of the bolt in the bolt hole of flange 12 (FIG. 1). Since the threads of bolt 22 terminate at a point spaced well outwardly from surface 28, there is no problem of the adhesive smearing the threads.

Then with surfaces 28 and 30 coated as described above, the hub and drum are brought together in an assembly machine of conventional construction which is adapted to support both parts and press them together with a predetermined clamping pressure. This machine may also be adapted, upon the parts being brought into sufficient mating relationship and while the parts are being held coaxial with one another by the machine fixture, to stake the shank of bolts 22 over adjacent the outer surface of flange 32 to thereby mechanically hold the parts together. Preferably, the squeeze pressure applied in the assembly and staking machine is sufficient to extrude the partially cured epoxy out of the exposed end surface of the joint, and to bring the parts almost into metal-to-metal contact. This insures complete filling of the voids between the "mating" surface of the parts without introducing distortion into the parts due to excess stress.

The subassembly of the hub and drum is then removed from the machine and passed through a hot wash operation which removes the excess epoxy flash-squeezed from between the parts. This hot wash operation also provides external heat which accelerates the cure time of the epoxy adhesive material 34. The subassembly is then allowed to stand (usually in plant storage) until joint material 34 is completely cured and hardened. The drum and hub are now a unitary subassembly securely held together by the mechanical-staking operation, their union being further augmented by the adhesive characteristics of the epoxy filler material 34.

From the foregoing description, it will now be apparent that the brakedrum and wheel hub assembly of the present invention, and the above-described method of making the same, offer simplicity and economy of construction and provide a marked improvement in the brakedrum due to the reduction in distortion of brake track 18 which in turn is reflected as an improvement in vehicle-braking performance.

I claim:

1. A metal brakedrum and wheel hub assembly comprising a metal wheel hub having a mounting flange transverse to the axis of said hub, a metal brake drum having a back with a machined mounting surface surrounding a central aperture in the back, said hub extending through said aperture and said hub flange having an annular machined mounting surface juxtaposed to said back-mounting surface with said surfaces almost in metal-to-metal contact in the juxtaposed areas of said surfaces with random spaces therebetween due to the uneven contour of said machined surfaces, and a hard, rigid plastic material interposed between said mounting surfaces in a layer extending throughout said random spaces defined by the juxtaposed areas of said surfaces, said layer having a varying thickness matching the random spacing between said juxtaposed metal surfaces to thereby fill the voids and valleys defined by the juxtaposed uneven contours of said surfaces, said plastic material being adapted to withstand the clamping pressure exerted by wheel mounting bolts extending through said flanges when a wheel is clamped to said drum and hub by such wheel-mounting bolts, said plastic material comprising an adhesive material having a flowable consistency in its uncured state and being extruded prior to curing by juxtaposing and squeezing said hub and drum to their final assembled positions relative to one another so that said adhesive material is of just sufficient thickness to fill the voids between said juxtaposed metal surfaces in the assembled condition of said hub and drum, said adhesive material being cured and hardened in situ to help bond said hub and drum together.

2. The brakedrum assembly as set forth in claim 1 wherein said plastic-adhesive material comprises a two-part epoxy adhesive made up of a resin and a hardener intermixed in said layer prior to being extruded by said squeezing of said hub and drum.

* * * * *